United States Patent Office 3,849,422
Patented Nov. 19, 1974

3,849,422
PYRIDINE COMPOUNDS
Claus Weis, Pfeffingen, Switzerland, assignor to Ciba-Geigy Corporation, Ardsley, N.Y.
No Drawing. Filed Oct. 10, 1972, Ser. No. 296,430
Claims priority, application Switzerland, Oct. 27, 1971, 15,639/71; Mar. 3, 1972, 3,132/72; Mar. 7, 1972, 3,314/72; Sept. 7, 1972, 13,142/72
Int. Cl. C07d 31/26
U.S. Cl. 260—290 HL                    5 Claims

ABSTRACT OF THE DISCLOSURE
Compounds of the formula

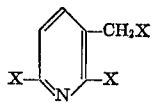

wherein X represents chlorine or bromine, their manufacture and their use in pest control, particularly as fungicides, is disclosed.

---

The present invention relates to 2,6-dichloro-3-chloro- and 2,6-dibromomethylpyridines, a process for their manufacture and their use in pest control. The pyridines have the formula

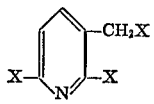 (I)

wherein X represents chlorine or bromine.

The formula I therefore comprises the two compounds

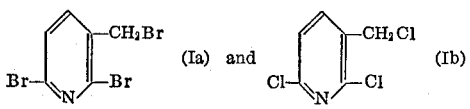

It is known from the literature that it is possible to manufacture 2,3,6-trichloropyridine in admixture with 2,3,5,6-tetrachloro- and 2,6-dichloropyridine by reacting glutarimide with phosphorus pentachloride.

The discovery has now been made that it is possible to manufacture the compounds of the formula I in a simpler and more economical manner with very good yields by reacting 3-halogeno-3-halogenomethyl-glutarimide of the formula

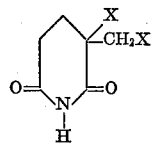 (II)

wherein X represents chlorine or bromine, with a phosphoroxy halide of the formula $POX_3$, wherein X has the meaning indicated above, at a temperature between 90 and 180° C .(for the chlorine compounds, preferably between 155° C. to 165° C., in particular at 160° C. in an autoclave; and for the bromine compounds, preferably at 95° C. to 120° C., particularly at about 100° C. in an open vessel or in an autoclave).

The phosphoroxy chloride or bromide is used appropriately in a 5 to 10-fold excess over the stoichiometrically required amount.

The compounds of the formula II are new. They may be prepared by methods known in the art, for example by halogenating, i.e. chlorinating or brominating α-methyleneglutaric nitrile (2,4-dicyano-but-1-ene) of the formula

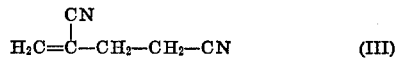 (III)

and then chlorinating or cyclising in conventional manner the new 1,2-dihalogeno-2,4-dicyanobutane of the formula

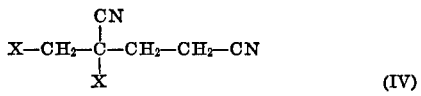 (IV)

wherein X has the indicated meaning, to give the compounds of the formula II.

The compounds of the formula I are suitable for combating various kinds of animal and plant pests. Preeminent, however, is the combating of representatives of the division Thallophyta, e.g. bacteria and fungi, especially of plant pathogenic fungi in cereals, maize, rice, vegetables, vines, ornamental plants, fruit, and other cultures. Thus the compounds of the formula I act against e.g. the following orders and subclasses of fungi: Oomycetes; Zygomycetes; Endomycetales; Aspergillales; Microascales; Protomycetales; Erysiphales; Taphrinales; Pezizales; Helotiales; Phacidiales; Sphaeriales; Clavicipitales; Myriangiales; Dothiorales; Pseudospaeriales; Aphyllophorales; Tremellales; Auriculariales; Uredinales and Ustilaginales.

The compounds of the formula 1 also display action against fungi which attack the plants from the soil and partially cause tracheomycosis.

According to the invention it is also possible to treat and effectively protect all kinds of seed from attack by fungus, e.g. seeds of cereals, rye, barley, oats, maize, rice, cotton, sugar beet, vegetables; also seed potatoes, sugar cane cuttings, ground nuts or flower bulbs, whereby the combating of practically all phytopathogenic fungi and their spores which damage seeds present in the soil and lead to serious parasitic plant diseases is rendered possible.

The fungicidal action of the compounds of the formula I can be substantially broadened and adapted to the given circumstances by the addition of other fungicides. The following compounds, for example, are suitable additives:

elementary sulphur
ammonium polysulphide and metal polysulphides
boric acid and borates
nickel sulphate
potassium chromate
copper (I) oxide (KUPFEROXID)
Bordeaux broth and further inorganic and organic copper salts
bis-(tri-n-butyl tin)oxide
triphenyl tin hydroxide (FENTINHYDROXID)
triphenyl tin acetate (FENTINACETAT) and further organic tin compounds
methyl mercury-8-hydroxyquinolate (Ortho LM)
N-(methyl mercury)-1,4,5,6,7,7-hexachlorobicyclo [2.2.1]hept-5-ene-2,3-dicarboximide
N-(ethylmercury)-1,4,5,6,7,7-hexachlorobicyclo [2.2.1]hept-5-ene-2,3-dicarboximide
N-(ethyl mercury)-p-toluenesulphonic anilide
phenyl mercury acetate (PMA)
phenyl mercury urea
mixture of ethyl mercury-2,3-dihydroxypropyl mercaptide and ethyl mercury acetate and further inorganic and organic mercury compounds
O,O-diethyl-phthalimidiphosphonothioate
5-amino-bis-(dimethylamido)phosphinyl-3-phenyl-1,2,4-triazole (TRIAMIPHOS)

5-methylamino-bis-(dimethylamido)-phosphinyl-3-phenyl-1,2,4-triazole
O,O-diethyl-O-2-pyrazinyl-phophorothioate
O-ethyl-S,S-diphenyl-phosphorodithioate
O-ethyl-S-benzyl-phenyl phosphonodithioate
O,O-diisopropyl-S-benzyl-phosphorothioate
O-butyl-S-ethyl-S-benzyl-phosphorodithioate
O-pentachlorophenyl-bis-(dimethylamido)-phosphate
O-ethyl-S-benzyl-phenyl-phosphonate
diethylamido-benzenethiophosphonic-2-methyl-imidazolide
methylbromide
methyl isocyanate
1,3-dichloropropene and related halogenated $C_3$ and $C_4$ hydrocarbons
1-chloro-2-nitro-propane
2-chloro-1-nitropropane
dichlorotetrafluoroacetone
sorbic acid and its potassium salts
dodecylguanidine acetate (dodine)
dodecylguanidine phthalate
acetylene dicarboxylic diamide
1,2,-dicyano-1,2-dichloroethylene
1,2-dichloro-1-(methylsulphonyl)ethylene
1,2-dichloro-1-(butylsulphonyl)ethylene
trans-1,2-bis-(n-propylsulphonyl)ethylene
bis-(1,2-trichloroethyl)sulphoxide
bis-(n-propyl-chlorodifluoromethylthio)-sulphone diamide
p-dichlorobenzene
hexachlorobenzene (HCB)
1,2,4-tetrachloro-4-nitrobenzene (TECNACEN)
pentachloronitrobenzene (QUINTAZEN)
isomer mixture of 1,3,4-trichloro-2,6-dinitrobenzene and 1,2,3-trichloro-4,6-dinitrobenzene
2,4,5,6-tetrachloroisophthalic nitrile
2,4-dinitrophenyl-thiocyanate
diphenyl
o-nitrodiphenyl
1-chloro-2,4-dinitronaphthalene
2,4,6-trichlorophenyl
2,4,5-trichlorophenyl-chloroacetate
trichlorophenol, zinc salt
m-cresyl acetate
2,3,4,6-tetrachlorophenol
pentachlorophenol (PCP)
o-dihydroxybenzene
2,4-dioxy-n-hexylbenzene
2-phenylphenol
3,5-dibromosalicylaldehyde
2-benzyl-4-chlorophenol
2,2'-dihydroxy-5,5'-dichloro-diphenylmethane (DICHLORPHEN)
2,2'-dihydroxy-3,3',5,5',6,6'-hexachloro-diphenylmethane
2,2'-dihydroxy-5,5'-dichloro-diphenylsulphide
2,2'-dihydroxy-3,3',5,5'-tetrachloro-diphenylsulphide
disodium-2,2'-dihydroxy-3,3',5,5'-tetrachloro-diphenyl-sulphide
4-chloro-o-phenylphenol
1,4-dichloro-2,5-dimethoxybenzene (CHLORNEB)
salicylanilide
1,2-bis-(3-methoxycarbonyl-2-thiourea)-benzene
1,2-bis-(3-ethoxycarbonyl-2-thiourea)-benzene
(3,5-dimethyl-4-chlorophenoxy)-ethanol
1,4-dichloro-2,5-dimethoxybenzene
2,4,5-trichlorophenylsulphonylmethylthiocyanate
phenylmercapto-methanesulphonamide
2-(1-methyl-n-propyl)-4,6-dinitrophenyl-2-methyl-crotonate (BINAPACRYL)
2-(1-methyl-n-propyl)-4,6-dinitrophenylisopropyl-carbonate (DINOEUTON)
2-(1-methyl-n-heptyl)-4,6-dinitrophenylcrotonate (DINOCAP)
methyl-2,6-dinitro-4-(1-ethyl-hexyl)phenylcarbonate
methyl-2,6-dinitro-4-(1-propyl-pentyl)phenylcarbonate (DINOCTON)
4-nonyl-2,6-dinitro-phenylbutyrate
S-methyl-2-(1-methyl-n-heptyl)-4,6-dinitrophenylthio-carbonate
1-(3,4-dichloroanilino)-1-formylamino-2,2,2-trichloro-ethane
2,6-dichloro-4-nitroaniline (DICHLORAN)
2-cyanoethyl-N-phenylcarbamate
propynyl-N-phenylcarbamate
2-methyl-benzoic anilide
2-iodo-benzoic anilide
2-chloro-benzoic anilide
2,3,5,6-tetrachloro-benzoquinone(1,4) (CHLORANIL)
2,3-dichloro-naphthoquinone(1,4) (DICHLON)
2-amino-3-chloro-naphthoquinone (1,4)
2-chloro-3-acetamino-naphthoquinone(1,4)
4-methyl-2,3,5,10-tetrahydro-3,5,10-trioxo-4H4-H-naphtho(2,3-b)-1,4-thiazine
quinoximbenzoylhydrazone (BENQUINOX)
N-(trichloromethylthio)phthalimide (FOLPET)
N-(trichloromethylthio)cyclohex-4-ene-1,2-dicarbox-imide (CAPTAN)
N-(1,1,2,2-tetrachloroethylthio)cyclohex-4-ene-1,2-dicarboximide (CAPTAFOL)
N-(1,1,2,2-tetrachloroethylthio)cyclohex-4-ene-1,2-dicarboximide
N'-dichlorofluoromethylthio-NN-dimethyl-N'-phenyl-sulphamide (DICHLOFLUANIDE)
S-(2-pyridyl-1-oxide)-S'-trichloromethyl-disulphide:hy-drochloride
sodium-N-methyl-dithiocarbamate (METHAM)
sodium-N,N-dimethyl-dithiocarbamate (DDC)
zinc-N,N-dimethyl-dithiocarbamate (ZIRAM)
iron-N,N-dimethyl-dithiocarbamate (FERBAM)
disodium-ethylene-1,2-bis-dithiocarbamate (NABAM)
zinc-ethylene-1,2-bis-dithiocarbamate (ZINEB)
manganese (II) -ethylene 1,2-bis-dithiocarbamate (MANEB)
zinc-propylene-1,2-bis-dithiocarbamate (MEZINEB) (PROPINEB)
complex consisting of (MANEB) and zinc (MANCOZEB)
tetramethylthiuramdisulphide (THIRAM)
complex consisting of (ZINEB) and polyethylene thiuramdisulphide (METIRAM)
bis-(3,4-dichloro-2(5)-furanoyl)ether (mucochloric anhydride)
2-methoxymethyl-5-nitrofuran
5-nitro-furfuradoxime-(2)
5-nitro-furfuryl-amidoxime-(2)
1-oxy-3-acetyl-6-methyl-cyclohexene-(5)dione(2,4) (de-hydroacetic acid
4,5,6,7-tetrachlorophthalide
3-[2-(3,5-dimethyl-2-oxycyclohexyl)-2-hydroxyethyl]-glutarimide (cycloheximide)
phthalimide
pyridine-2-thiol-1-oxide and 1-hydroxypyridine-2-thione
α,α-bis(4-chlorophenyl)-3-pyridine-methanol (PARINOL)
8-hydroxyquinoline (3-QUINOLINOL)
8-hydroxyquinoline-sulphate (CHINOSOL)
benzoyl-8-hydroxyquinoline-salicylate
6-ethoxy-1,2-dihydro-2,2,4-trimethylquinoline (ETHOXYQUIN)
N-lauryl-isoquinolinium bromide
9-(p-n-hexyloxyphenyl)-10-methyl-acridinium chloride
2-n-heptadecylimidazoline acetate (GLYODIN)
1-hydroxyethyl-2-heptadecylimidazoline
1-phenyl-3,5-dimethyl,4-nitrosopyrazole
1-p-chlorophenyl-3,5-dimethyl-4-nitrosopyrazole
N-(1-phenyl-2-nitropropyl)piperazine
N,N'-bis[1-formamido-2,2,2-trichloroethyl]piperazine
2-dimethylamino-6-methyl-5-n-butyl-4-hydroxy-pyrim-idine N-dodecyl-1,4,5,6-tetrahydropyrimidine
N-dodecyl-2-methyl-1,4,5,6-tetrahydroxypyrimidine
2-n-heptadecyltetrahydropyrimidine
1-(4-amino-4-propyl-5-pyrimidyl-methyl)-2-methyl-
   pyridinium-chloride hydrochloride
2-(2'-furyl)-benzimidazole (FUBERIDAZOL)
3-dodecyl-1-methyl-2-phenylbenzimidazolium ferri-
   cyanide
methyl-n-benzimidazol-2-yl-N-(butylcarbamoyl)car-
   bamate (BENOMYL)
2-(o-chloroanilino)-4,6-dichloro-sym.triazine
2-ethylamino-6-methyl-5-n-butyl-4-hydroxypyrimidine
2,6-dichloro-3,5-dicyano-4-phenylpyridine
α-(2,4-dichlorophenyl)-α-phenyl-5-pyrimidine-methynol
5-chloro-4-phenyl-1,2-dithiol-3-one
2,3-dicyano-1,4-dithia-anthraquinone (DITHIANON)
2-(4-thiazolyl)-benzimidazole
4-(2-chlorophenylhydrazono)-3-methyl-5-isoxazolone
   (DRAZOXOLON)
thiazolidinone-4-thione(2) (RHODANIN)
3-(p-chlorophenyl)-5-methylrhodanine
3,5-dimethyltetrahydro-1,3,5-thiadiazine-2-thione
   (DAZOMET)
3,3'-acetylene-bis-(tetrahydro-4,6-dimethyl)-2H-1,3,5-
   thiadiazine-2-thione) (MILNEB)
3-benzylidene-amino-4-phenylthiazoline-2-thione
6-chlorobenzthiazole-2-thiole, zinc salt
6-β-diethylamino-ethoxy-2-dimethylamino-benzthiazole-
   dihydrochloride
monoethanolammonium-benzthiazole-2-thiole
laurylpyridinium-5-chloro-2-mercaptobenzthiazole
6-(β-diethylaminoethoxy)-2-dimethylaminobenzthiazole-
   dihydrochloride
3-trichloromethylthiobenzothiazolone
3-trichloromethylthiobenzoxazolone
3-(trichloromethyl)-5-ethoxy-1,2,4-thiadiazole
6-methyl-2-oxo-1,3-dithiolo[4,5-b]-quinoxaline
   (QUINOMETHIONAT)
2-thio-1,3-dithiolo[4,5-b]-quinoxaline (THIOQUINOX)
2,3-dihydro-5-carboxanilido-6-methyl-1,4-oxathiine
2,3-dihydro-5-carboxanilido-6-methyl-1,4-oxathiine-
   4,4-dioxide
2,3-dihydro-5-carbox-o-diphenylamido-6-methyl-1,4-
   oxathiine
N-cyclododecyl-2,6-dimethylmorpholine acetate
N.tridecyl-2,6-dimethylmorpholine
3-(3',5'-dichlorophenyl)-5,5-dimethyloxazolidine-
   2,4-dione
cetyl-trimethylammonium bromide
n-alkyl($C_{12}$, $C_{14}$, $C_{16}$) dimethylbenzylammonium chloride
dialkyldimethylammonium bromide
alkyldimethylbenzylammonium chloride
alkyl $C_9$–$C_{15}$ tolylmethyltrimethylammonium chloride
p-di-isobutylphenoxyethoxyethyldimethylbenzylammo-
   nium chloride
gliotoxin
2,4-diguanidino-3,5,6-trihydroxycyclohexyl-5-deoxy-
   2-O-(2-deoxy-2-methylamino-α-L-glucopyranoxyl)3-
   C-formyl-β-L-lyxopentano-furanoside (STREP-
   TOMYCIN)
7-chloro-4,6-dimethoxycumaran-3-one-2-spiro-1'-(2'-me-
   thoxy-6'-methylcyclohex-2'-ene-4'-one (GRISEO-
   FULVIN)
4-dimethylamino-1,4,4a,5,5a,6,11,12a-octahydro-
   3,5,6,10,12,12a-hexahydroxy-6-methyl-1,11-dioxo-
   2-naphthacene-carboximide (OXYTETRACYCLIN)
7-chloro-4-dimethylamino-1,4,4a,5,5a,6,11,12a-octahy-
   dro-3,6,10,12,12a-pentahydroxy-6-methyl-1,11-di-
   oxo-2-naphthacene-carboximide (CHLOROTETRA-
   CYCLIN)
(PIMARCIN)
(LANCOMYCIN)
(PHLEOMYCIN)
(KASUGAMYCIN)
(PHYTOACTIN)
D(—)-threo-2,2-dichloro-N-3-hydroxy-a-(hydroxy-
   methyl)-p-nitrophenethyl-acetamide (CHLOR-
   AMPHENICOL)
blasticidin-S-methyl-benzylamino-benzenesulphonate
N-(3,5-dichlorophenyl)-succinimide
N-(3,5-dichlorophenyl)-itaconimide
N-(3-nitrophenyl)-itaconimide
phenoxyacetic acid
sodium-p-dimethylamino-benzenediazosulphonate
acrolein-phenylhydrazone
2-chloroacetaldehyde-(2,4-dinitrophenyl)-hydrazone
2-chloro-3-(tolysulphonyl)-propionitrile
1-chloro-2-phenyl-pentane-diol(4,5)-thione(3)
p-nonylphenoxypolyethyleneoxyethanol iodine complex
(α-nitromethyl)-o-chlorobenzylthioethylamine hydro-
   chloride
3-(p-t.butyl-phenylsulphonyl)-acrylonitrile
octachlorocyclohexenone
pentachlorobenzyl alcohol
pentachlorobenzyl acetate
pentachlorobenzaldehyde cyanohydrin
2-norcamphane-methanol
2,6-bis-(dimethylaminoethyl)-cyclohexanone
decachloro-octahydro-1,3,4-metheno-2H-cyclobuta[cd]
   pentalen-2-one
1-(3-chloroallyl)-3,5,7-triaza-1-azonia-adamantane
chloride The agents according to the invention are manufactured in known manner by intimately mixing and/or grinding active substances of the formula I with the suitable carriers, optionally with the addition of dispersants or solvents which are inert towards the active substances. The active substances may be available and can be used in the following forms:

Solid Forms

Dusts, tracking agents, granules, coated granules, impregnated granules and homogeneous granules.

Liquid Forms (a) active substances which are dispersible in water: wettable powders, pastes, emulsions;
(b) solutions.

To manufacture solid forms (dusts, tracking agents), the active substances are mixed with solid carriers. Suitable carriers are, for example; kaolin, talcum, bolus, loess, chalk, limestone, ground limestone, attaclay, dolomite, diatomaceous earth, precipitated silica, alkaline earth silicates, sodium and potassium aluminium silicates (feldspar and mica), calicum and magnesium sulphates, magnesium oxide, ground synthetic materials, fertilisers, for example ammonium sulphate, ammonium phosphate, ammonium nitrate, urea, ground vegetable products, such as corn meal, bark dust, sawdust, nutshell meal, cellulose powder, residues of plant extractions, activated charcoal, etc. These substances can either be used alone or in admixture with one another.

Granules can be very easily manufactured by dissolving an active substance of the formula I in an organic solvent and applying the resulting solution to a granulated material, for example attapulgite, $SiO_2$, granicalcium, bentonite, etc. and then evaporating the solvent.

Polymer granules can also be manufactured by mixing the active substances of the formula I with polymerisable compounds (urea/formaldehyde; dicyandiamide/formaldehyde; melamine/formaldehyde or others), whereupon a mild polymerisation is carried out that does not affect the active substances and in the process of which the granulation is carried out during the gel formation. It is more advantageous to impregnate finished, porous polymer granules (urea/formaldehyde, polyacrylonitrile, polyester or others) which have a specific surface area and a favourable predeterminable adsorption/desorption ratio, with the active substances, for example in the form of their solutions (in a low boiling solvent) and to remove the solvent. Polymer granules of this kind in the form of microgranules having a bulk density of 300 g./litre to 600 g./litre can also be manufactured with the aid of atomisers. The dusting can be carried out from aircraft over extensive areas of cultures of useful plants.

It is also possible to obtain granules by compacting the carrier with the active substance and carriers and subsequently comminuting the product.

To these mixtures can also be added additives which stabilize the active substance and/or non-ionic, anionic and cationic surface active substances, which for example improve the adhesion of the active ingredients on plants or parts of plants (adhesives and agglutinants) and/or ensure a better wettability (wetting agents) and dispersibility (dispersing agents). Examples of suitable adhesives are the following: olein/chalk mixture, cellulose derivatives (methyl cellulose, carboxymethyl cellulose), hydroxyethyl glycol ethers of monoalkyl and dialkyl phenols having 5 to 15 ethylene oxide radicals per molecule and 8 to 9 carbon atoms in the alkyl radical, lignin sulphonic acids, their alkali metal and alkaline earth metal salts, polyethylene glycol ethers (carbowaxes), fatty alcohol polyethylene glycol ethers having 5 to 20 ethylene oxide radicals per molecule and 8 to 18 carbon atoms in the fatty alcohol moiety, condensation products of ethylene oxide/propylene oxide, polyvinyl pyrrolidones, polyvinyl alcohols, condensation products of urea and formaldehyde, and also latex products.

The water-dispersible concentrates of the active substance, i.e. wettable powders, pastes and emulsifiable concentrates, are agents which can be diluted with water to any concentration desired. They consist of active substance, carrier, optionally additives which stabilize the active substance, surface-active substance and anti-foam agents and, optionally, solvents.

Wettable powder and pastes are obtained by mixing and grinding the active substances with dispersing agents and pulverulent carriers in suitable apparatus until homogeneity is attained. Carriers are, for example, those mentioned for the solid forms of application. In some cases it is advantageous to use mixtures of different carriers. As dispersing agents there can be used, for example, condensation products of sulfonated naphthalene and sulfonated naphthalene derivatives with formaldehyde, condensation products of naphthalene or naphthalene sulfonic acids with phenol and formaldehyde, as well as alkali, ammonium and alkaline earth metal salts of lignin sulfonic acid, in addition, alkylaryl sulfonates, alkali and alkaline earth metal salts of dibutyl naphthalene sulfonic acid, fatty alcohol sulfates such as salts of sulfated hexadecanols, heptadecanols, octadecanols, and salts of sulfated fatty alcohol glycol ethers, the sodium salt of oleoyl ethionate, the sodium salt of oleoyl methyl tauride, ditertiary acetylene glycols, dialkyl dilauryl ammonium chloride and fatty acid alkali and alkaline earth metal salts.

Suitable anti-foam agents are silicones.

The active substances are mixed, ground, sieved and strained with the additives mentioned above that, in wettable powder, the solid particle size of from 0.02 to 0.04 and in parts, of 0.03 is not exceeded. To produce emulsifiable concentrates and pastes, dispersing agents such as those cited above, organic solvents and water are used. Examples of suitable solvents are the following: alcohols, benzene, xylene, toluene, dimethyl sulfoxide, and mineral oil fractions boiling between 120 and 130° C. The solvents must be practically odorless, not phytotoxic, inert to the active substances and not readily inflammable.

Furthermore, the agents according to the invention can be applied in the form of solutions. For this purpose the active substance or several active substances of the general formula I are dissolved in suitable organic solvents, mixtures of solvents or in water. Aliphatic and aromatic hydrocarbons, chlorinated derivatives thereof, alkyl naphthalenes, and mineral oils alone or mixed with each other, can be used as organic solvents.

The content of active substance in the above described agents is between 0.1% to 95%, in which connection it should be mentioned that in the case of application from aircraft or some other suitable means of application, it is possible to use concentrations of up to 99.5% or even pure active substance.

The active substances of the formula I can, for example, be formulated as follows:

Dusts

The following substances are used to manufacture (a) a 5% and (b) a 2% dust:

(a) 5 parts of active substance
   95 parts of talcum
(b) 2 parts of active substance
   1 part of high disperse silica
   97 parts of talcum.

The active substances are mixed with the carriers and ground.

Granules

The following substances are used to produce 5% granules:

5 parts of active substance,
0.25 parts of epichlorohydrin,
0.25 parts of cetyl polyglycol ether,
3.50 parts of polyethylene glycol,
91 parts of kaolin (particle size 0.3–0.8 mm.).

The active substance is mixed with epichlorohydrin and dissolved with 6 parts of acetone; the polyethylene glycol and cetyl polyglycol ether are then added. The thus obtained solution is sprayed on to kaolin, and the acetone subsequently evaporated in vacuo.

Wettable powder

The following constituents are used for the preparation of (a) a 40%, (b) and (c) a 25%, and (d) a 10% wettable powder:

(a) 40 parts of active substance,
   5 parts of sodium lignin sulphonate,
   1 part of sodium dibutyl-naphthalene sulphonate,
   54 parts of silica,
(b) 25 parts of active substance,
   4.5 parts of calcium lignin sulphonate
   1.9 parts of Champagne chalk/hydroxyethyl cellulose mixture (1:1),
   1.5 parts of sodium dibutyl naphthalene sulphonate,
   19.5 parts of silica acid,
   19.5 parts of Champagne chalk,
   28.1 parts of kaolin.
(c) 25 parts of active substance,
   2.5 parts of isooctylphenoxy - polyoxyethylene - ethanol,
   1.7 parts of Champagne chalk/hydroxyethyl cellulose mixture (1:1),
   8.3 parts of sodium aluminium silicate,
   16.5 parts of kieselguhr,
   46 parts of kaolin.
(d) 10 parts of active substance,
   3 parts of a mixture of the sodium salts of saturated fatty alcohol sulphates,
   5 parts of naphthalenesulphonic acid/formaldehyde condensate,
   82 parts of kaolin.

The active substances are intimately mixed, in suitable mixers, with the additives, the mixture being then ground in the appropriate mills and rollers. Wettable powders are obtained which can be diluted with water to give suspensions of any desired concentration.

Emulsifiable Concentrates

The following substances are used to produce (a) a 10% and (b) a 25% emulsifiable concentrate:

(a) 10 parts of active substance,
3.4 parts of epoxidised vegetable oil,
13.4 parts of a combination emulsifier consisting of fatty alcohol polyglycol ether and alkylarylsulphonate calcium salt,
40 parts of dimethylformamide,
43.2 parts of xylene.
(b) 25 parts of active substance,
2.5 parts of epoxidised vegetable oil,
10 parts of an alkylarylsulphonate/fatty alcohol-polyglycol ether mixture
5 parts of dimethylformamide,
57.5 parts of xylene.

From these concentrates it is possible to produce, by dilution with water, emulsions of any desired concentration.

EXAMPLE 1

I. Manufacture of 1,2-dichloro-2,4-dicyanobutane

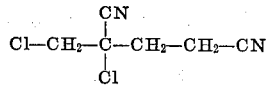

(a) A 6 litre sulphating flask is fitted with a reflux cooler and a gas distribution tube carrying a frit. The gas distribution tube is connected by a latex tube via a gas-flow meter to a chlorine gas pressure flask, which in turn rests on a balance. The top end of the reflux cooler is connected to a gas exit tube which conducts the evolved hydrogen chloride and the excess chloride into an absorption vessel. This sulphating flask is charged with 530 g. (5 moles) of distilled α-methyleneglutaric nitrile and 3800 ml. of chloroform. The resulting solution is then heated to the boil using two IR lamps fitted to the bottom of the flask, whereupon 1300 g. (18.3 moles) of chlorine are passed in within 6 hours while irradiating with a UV lamp (type PHILIPS 57205 E/99 HRR, 125 watts) which is fitted to the exterior of the reaction vessel at an interval of 2 cm.

Completion of the reaction can be easily determined by means of a thin layer chromatogram (adsorbent: silica gel, eluant: petroleum ether/chloroform 1:1, development reagent; potassium permanganate solution), since in this way any α-methyleneglutaric nitrile still present is rendered visible.

Upon completion of the reaction, excess chlorine and hydrogen chloride which is still present are expelled by introducing nitrogen into the reacting vessel for 20 minutes. After a small amount of first runnings (about 30 g.), 841 g (95% of theory) of 1,2 - dichloro - 2,4 - dicyanobutane are obtained; b.p. 130–133° C./1.5 Torr; $n_D^{20}$=1.4883. In the distillation flask there remain 83 g. of a high boiling residue.

Analysis of $C_6H_6Cl_2N_2$ (molecular weight 177.0).—Calculated: C, 40.72%; H, 3.42%; Cl, 40.06%; N, 15.83%. Found: C, 40.43%; H, 3.34%; Cl, 40.22%; N, 15.87%.

In the above Example it is also possible to use an equivalent amount of carbon tetrachloride as solvent instead of 3800 ml. of chloroform and otherwise carrying out the same procedure.

(b) Using the above described apparatus, 143 g. (2 moles) of chlorine are passed into a mixture of 212 g. (2 moles) of α-methyleneglutaric nitrile and 50 g. (0.64 mole) of pyridine at 15–20° C. with periodic cooling and within 4.5 hours. The resulting viscous product is dissolved in 2 litres of diethyl ether and shaken with 200 ml. of dilute hydrochloric acid. The insoluble components are then filtered off, the aqueous phase is isolated and the ether phase washed twice with water and dried over magnesium sulphate. After distilling off the diethyl ether, the residue is distilled. After first runnings of 108 g. of starting material (α-methyleneglutaric nitrile) 82 g. (28% of theory) of 1,2-dichloro-2,4-dicyanobutane are obtained; b.p. 110° C./0.5 Torr. The IR spectrum of the resulting product is in accord with that of the 1,2-dichloro-2,4-dicyanobutane obtained according to (a).

(c) Using the apparatus described above under (a), 166 g. (2.34 moles) of chlorine are passed at 20° C. into a mixture of 106 g. (1 mole) of α-methyleneglutaric nitrile and 500 ml. of phosphoroxy chloride. After a reaction time of 4 hours the phosphoroxy chloride is removed in a rotary evaporator. Upon distillation of the residue at 110–116° C./0.3 Torr, 150 g. (85% of theory) of 1,2-dichloro-2,4-dicyanobutane are obtained.

The IR spectrum of the resulting product is in account with that of the 1,2-dichloro-2,4-dicyanobutane obtained according to (a).

II. Manufacture of 3-chloro-3-chloromethyl-glutarimide

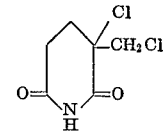

A 3 litre round flask fitted with a reflux cooler and a stirrer is charged with 354 g. (2 moles) of the 1,2-dichloro-2,4-dicyanobutane manufactured according to section (a) of the above Example and a mixture of 1200 ml. of acetic acid and 280 g. (2.2 moles) of 78% sulphuric acid. The reaction mixture is then heated to reflux for 2 hours while stirring. After being cooled to about 20° C. it is poured into 5 litres of ice water, the resulting precipitate is filtered off after 3 hours and washed on the filter with water until the washings show neutral reaction. The filtrate is dried over calcium chloride in a vacuum drying cabinet at 40° C. to give 334.7 g. (85% of theory) of 3-chloro-3-chloromethyl-glutarimide in the form of slightly pink crystals (m.p.) 133–135° C.). Recrystallisation from water yields white crystals which melt at 134–135° C.

Analysis of $C_6H_7Cl_2NO_2$ (molecular weight of 196.0).—Calculated: C, 36.77%; H, 3.60%; Cl, 36.18%; N, 7.15%. Found: C, 36.69%; H, 3.62%; Cl, 36.08%; N, 7.30%.

III. Manufacture of 2,6-dichloro-3-chloromethyl-pyridine

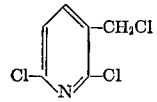

A 6 litre tantalum autoclave is charged with 588 g. (3 moles) of the 3-chloro-3-chloromethyl-glutarimide manufactured according to part II of this Example and 3 litres of phosphoroxychloride and the mixture is heated for 3 hours to 160° C. The resulting brown solution is subsequently freed from phosphoroxy chloride in a rotary evaporator and the still hot, black oily residue is poured into a mixture of about 3 litres of ice and water. The evaporating flask is also filled with ice water in order to dissolve any residue still adhering to the walls of the flask.

The ice/water mixture is stirred for about 4 hours until a pale brown crystal suspension has formed. The crystals are suctioned off and washed on a filter with water. To remove any acid residues and non-decomposed amounts of polyphosphoric acids the reaction product is rinsed from the filter with water and stirred in 1.5 litres of water for 1–2 hours. This washing procedure is repeated once more, whereupon the crystals are filtered off and dried over phosphorous pentoxide in a vacuum drying cabinet at 25° C., when 556 g. (94.3% of theory) of crude 2,6-dichloro- 2-chloromethyl-pyridine are obtained. By sublimation of this crude product at a bath temperature of 85–95° C./0.5 Torr. 409 g. (69.3% of theory) of white crystals are obtained; m.p. 79–82° C.

Analysis of $C_6H_4Cl_3N$ (molecular weight 196.0).— Calculated: C, 36.67%; H, 2.06%; Cl, 54.12%; N, 7.18%. Found: C, 36.70%; H, 2.21%; Cl, 53.79%; N, 7.21%.

EXAMPLE 2

I. Manufacture of 2-amino-5-chloro-5-chloromethyl-6,6-dibromo- or 2 - amino - 3-chloro-3-chloromethyl-6,6-dibromo-3,4,5,6-tetrahydropyridinium bromide 250 g. (1.41 moles) of the 1,2 - dichloro - 2,4 - dicyanobutane manufactured according to Example 1, part I, are dissolved in 2500 ml. of methylene chloride. The resulting solution is saturated at —10° C. with gaseous hydrogen bromide. The reaction mixture is then left to stand for 3 hours at —5° C. to —10° C., whereupon the resulting precipitate is filtered off. The reaction product thus obtained is subsequently freed from still adhering hydrogen bromide and solvent in a vacuum cabinet at 50° C., to give 524 g. (89% of theory) of the desired product; m.p. 180° C. (with decomp.).

Analysis of $C_6H_9Br_3Cl_2N_2$ (molecular weight 419.8).— Calculated: C, 17.17%; H, 2.16%; Br, 57.21%; Cl, 16.89%; N, 6.67%. Found: C, 17.6%; H, 2.2%; Br, 57.3%; Cl, 17.3%; N, 7.0%.

II. Manufacture of 3-chloro-3-chlormethylglutarimide 21 g. (0.05 mole) of the compound obtained according to part I of this Example are heated to the boil in 200 ml. of water for 20 minutes. About 80% of the water is then removed in a rotary evaporator and the reaction mixture cooled to room temperature (20–25° C.) to give 13.9 g. (66%) of 3-chloro-3-chloromethylglutarimide; m.p. 131–133° C. (from water).

Analysis of $C_6H_7Cl_2NO_2$ (molecular weight 196.0).— Calculated: C, 36.77%; H, 3.60%; Cl, 36.18%; N, 7.15%. Found: C, 36.69%; H, 3.62%; Cl, 36.08%; N, 7.30%.

The IR spectrum of the resulting product accords with that of the 3 - chloro - 3 - chloromethyl-glutarimide obtained according to Example 1, part II.

EXAMPLE 3

Manufacture of 3-chloro-3-chloromethyl-glutarimide (a) A solution flask of the kind described in Example 1, part (Ia) is charged with 1000 g. (9.42 moles) of distilled α-methyleneglutaric nitrile and 3500 ml. of chloroform. The resulting solution is then heated to the boil using 2 IR lamps fitted to the bottom of the flask, after which 1850 g. (2.61 moles) of chlorine are passed in within 8 hours while irradiating with a UV lamp (type Phillips 57205 E/99 HRR, 125 watt) which is fitted externally to the reaction vessel at an interval of 2 cm. Upon completion of the reaction, excess chlorine and hydrogen chloride still present are expelled by introducing nitrogen into the reaction mixture for 30 minutes. The chloroform is removed in an evaporator under a water jet vacuum at a bath temperature of 50–55° C., to give 1660 g. of crude 1,2-dichloro-2,4-dicyanobutane. Without intermediate purification 708 g. of this compound together with 2200 ml. of acetic acid and 500 g. of (3.9 moles) of 78% sulphuric acid are then charged into a 3 litre round flask. The reaction mixture is heated for 2 hours to the boil while stirring. After it has cooled to about 20° C., it is poured into 4 litres of ice water. The resulting precipitate is filtered off after 3 hours and washed on the filter with water until the washings show neutral reaction. The filtrate is then dried in a vacuum drying cabinet at 40° C. over calcium chloride to give 631.2 g. (80.5% of theory) of 3-chloro-3-chloromethylglutarimide in the form of slightly pink crystals; m.p. 131–132° C. Recrystallisation from water gives white crystals which melt at 134–135° C. and whose mixed freezing point shows no lowering in admixture with the 3-chloro-3-chloromethyl-glutarimide obtained according to Example 1, part II. The IR spectrum of the resulting product also accords with that of the 3-chloro-3-chloromethyl-glutarimide manufactured according to Example 1, part II.

(b) While stirring 20 g. (0.086 mole) of the crude 1,2-dichloro-2,4-dicyanobutane obtained according to part (a) of the above Example are heated to a gentle boil for 25 minutes in the described apparatus in 240 ml. of concentrated hydrochloric acid. The hydrochloric acid is then removed in a rotary evaporator and the residue is treated with 80 ml. of water. The reaction product is then filtered and dried as described above to give 14.1 g. (75% of theory) of crystalline 3-chloro-3-chloromethyl-glutarimide (m.p. 129–132° C.) which has a melting point of 134–135° C. after recrystallisation from water. The mixed freezing point of the obtained product shows no lowering in admixture with the 3-chloro-3-chloromethylglutarimide obtained according to Example 1, part II. The IR spectrum also accords with that of the 3-chloro-3-chloromethyl-glutarimide manufactured according to the cited Example.

The 3-chloro-3-chloromethyl-glutarimide obtained according to part (a) and (b) of the above Example is subsequently converted into the 2,6-dichloro-3-chloromethylpyridine in the manner described in Example 1, part III, in the process of which the resulting crude product is purified not by sublimation, but by distillation at 143–145° C./14 torr. The 2,6-dichloro-3-chloromethylpyridine according to the invention can be used for plant protection. In particular, the new compound (I) possesses excellent fungicidal properties, chiefly as soil fungicide and seed disinfectant, against phytopathogenic fungi in various cultivated plants, such as cereals, maize, rice, vegetables, ornamental plants, fruit varieties, vines, field produce etc.

EXAMPLE 4

I. Manufacture of 1,2-dibromo-2,4-dicyanobutane

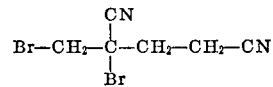

To a solution of 318.3 g. (3 moles) of α-methyleneglutaric nitrile in 1000 ml. of methylene chloride are added 479.5 g. (3 moles) of bromine within 2 hours while stirring and cooling the reaction mixture with an ice bath to 0–10° C. During the entire addition of bromine the solution is irradiated with a UV lamp (type Philips 57205 E/99 HRR, 125 watt).

Upon completion of the addition of bromine the irradiation is continued for 30 minutes and the solvent is subsequently removed in a rotary evaporator. A few drops of the residual oil are then crystallised on a watch glass and the remainder of the oily reaction product is then inoculated therewith. After a brief time the reaction product is completely crystallised and 779 g. (97.6% of theory) of crude 1,2-dibromo-2,4-dicyanobutane butane (m.p. 48–50° C.) are obtained. Recrystallisation thereof from benzene gives almost white crystals which have a melting point of 51–52° C.

Analysis of $C_6H_6Br_2N_2$ (molecular weight 266.0).— Calculated: C, 27.09%; H, 2.28%; Br, 60.08%; N, 10.53%. Found: C, 27.03%; H, 2.20%; Br, 60.18%; N, 10.59%.

II. Manufacture of 3-bromo-3-bromomethyl-glutarimide

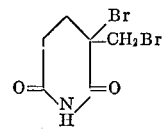

53.2 g. (0.2 mole) of the 1,2-dibromo-2,4-dicyanobutane manufactured according to part II of this Example are heated under reflux for 5 hours in a mixture of 120 ml.

of acetic acid and 28 g. of 78% sulphuric acid. After it has been cooled to about 20° C., the reaction mixture is poured very slowly and while stirring thoroughly into 500 ml. of ice water. The mixture is left to stand for 12 hours and then any crystal agglomerates still present are titrated with a small amount of water in a mortar. The crystals obtained are filtered off, washed with water and dried at 50° C. over diphosphorus pentoxide to give 44.6 g. (78.2% of theory) of 3 - bromo - 3 - bromomethyl-glutarimide which has a melting point of 115–116° C. after recrystallisation thrice from ethanol.

Analysis of $C_6H_7Br_2NO_2$ (molecular weight 284.9).—Calculated: C, 25.29%; H, 2.48%; Br, 56.08%; N, 4.91%. Found: C, 25.35%; H, 2.55%; Br, 56.06%; N, 4.99%.

III. Manufacture of 2,6-dibromo-3-bromomethylpyridine

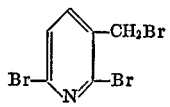

A mixture of 85.5 g. (0.3 mole) of the 3-bromo-3-bromomethyl-glutarimide manufactured according to part II of this Example and 429.9 g. (1.5 moles) of phosphoroxy bromide is heated for 4 hours in a flask which is immersed in an oil bath heated to 100° C. After it has cooled to about 20° C., the reaction mixture is poured into 5 litres of ice water and the precipitate which has formed is filtered off with suction. The precipitate is dissolved in 2 litres of diethyl ether and the resulting ether solution is extracted three times with 100 ml. of water on each occasion and dried over magnesium sulphate. The diethyl ether is subsequently removed in a rotary evaporator to give 90.4 g. (97.1% of theory) of crude 2,6-dibromo-3-bromomethylpyridine in the form of white crystals (m.p. 76–103° C.). The crude product (90.4 g.) is subsequently dissolved in 500 ml. of boiling cyclohexane and the solution is cooled to 15–20° C. In the process 53.4 g. of crystals are obtained which in turn are dissolved in 450 ml. of boiling cyclohexane. The solution is cooled to 15–20° C. and the crystals are filtered off to yield 40.8 g. (41.4% of theory) of pure 2,6-dibromo-3-bromomethylpyridine (m.p. 99–101° C.).

Analysis of $C_6H_4Br_3N$ (molecular weight 329.84).—Calculated: C, 21.85%; H, 1.22%; Br, 72.69%; N, 4.24%. Found: C, 21.90%; H, 1.31%; Br, 72.38%; N, 4.40%.

EXAMPLE 5

Manufacture of 3-bromo-3-bromomethyl-glutarimide (a) 117 g. (4.2 moles) of the crude 1,2-dibromo-2,4-dicyanobutane obtained according to part I, Example 4, are heated under reflux without intermediate purification for 4 hours in a mixture of 2500 ml. of acetic acid and 588 g. of 78% sulphuric acid. After it has been cooled to about 20° C., the reaction mixture is poured very slowly and while stirring thoroughly into about 7000 ml. of ice water. The batch is left to stand for 12 hours and subsequently any crystal agglomerates still present are titrated with a little water in a mortar. The resulting pale brown precipitate is filtered with suction, washed with water and dried over diphosphorus pentoxide at 40° C., to give 1003 g. (83.7% of theory) of crude 3-bromo-3-bromomethyl-glutarimide (m.p. 106–110° C.) which yields crystals with a melting point of 115–116° C. after recrystallisation thrice from ethanol. The mixed freezing point of the resulting product shows no lowering in admixture with the 3-bromo-3-bromomethyl-glutarimide obtained according to Example 1, part II.

The IR spectrum also accords with that of the 3-bromo-3-bromomethyl-glutarimide manufactured according to the cited Example.

(b) 266 g. (1 mole) of the crude 1,2-dibromo-2,4-dicyanobutane obtained according to Example 1, part I, are heated to the boil for 2½ hours in 700 ml. of concentrated hydrochloric acid. Upon completion of the reaction, the hydrochloric acid is removed in a rotary evaporator and the residue is treated with 1.5 litres of acetone and the filtrate is evaporated to dryness. The residue is crystallised by treatment with an inoculating crystal or by rubbing it against the wall of the reaction vessel; 250 g. (87.6% of theory) of 3-bromo-3-bromomethyl-glutarimide are obtained. Recrystallisation twice of the reaction product from ethanol yields white crystals which have a melting point of 108–110° C.

Analysis $C_6H_7Br_2NO_2$ (molecular weight 284.9).—Calculated: C, 25.29%; H, 2.48%; Br, 56.08%; N, 4.91%. Found: C, 25.3%; H, 2.5%; Br, 55.8%; N, 5.0%.

The IR spectrum of the obtained product accords with that of the 3-bromo-3-bromomethyl-glutarimide manufactured according to Example 1, part I.

The 3-bromo-3-bromomethyl-glutarimide obtained according to part (a) or (b) of the above Example is subsequently converted into the 2,6-dibromo-3-bromomethylpyridine in the manner described in Example 1, part III.

EXAMPLE 6

Action against Botrytis cinerea on Vicia faba

Fully developed, uniformly large leaves of Vicia faba, which have been sprayed dripping wet from a spraying device with a broth (0.05% content of active substance) prepared from an active substance formulated as a 10% wettable powder, were placed three at a time in Petri dishes lined with filter paper. When the leaves were dry again, they were infected with a freshly prepared, standardised spore suspension of the fungus (concentration: 100,000 spores/ml.) and kept for 48 hours in a humid atmosphere at 20° C. After this time, the leaves displayed black, initially dot-shaped specks which rapidly spread. The number and size of the infected areas served as a yardstick for determining the effectiveness of the test substance.

The compounds of the formulae Ia and Ib acted against Botrytis cinerea.

EXAMPLE 7

Action as disinfectant

The feasibility of using the active substances Ia and Ib for protecting parts of plants which are in the soil and seeds was proved after the following tests had been carried out:

Action against soil fungi 500 p.p.m. of active substance was worked into dry, sterilized soil by thorough mixing. Plastic containers of 250 ml. content were then each filled with 100 ml. of this soil. About 10 sterilised oat seeds which were penetrated by fungus mycelia of one of each of the following fungi:

Fusarium oxysporum, Pythium debaryanum, Rhizoctonia solani were put into each of these containers below the surface of the soil. The containers were then each moistened with 34 ml. of distilled water and incubated at 20 to 24° C. Evaluation was carried out after 5 days, when it was ascertained whether fungus mycelia from the seeds were growing into the surrounding soil.

Action against fungi which attack seeds

Wheat seeds were artificially infected with the fungus Fusarium nivale. The wheat was then disinfected with 200 p.p.m. of active substance and laid out on moist filter paper in Petri dishes. The development of fungus mycelia was evaluated after 10 days incubation at 20 to 24° C.

What is claimed is:

1. A compound of the formula

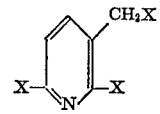

wherein X represents chlorine or bromine.

2. A compound according to claim 1 of the formula

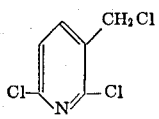

3. A compound according to claim 1 of the formula

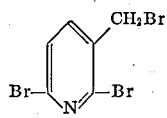

4. A process for the manufacture of a compound of the formula

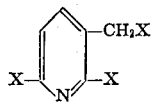

wherein X represents chlorine or bromine, wherein a glutarimide compound of the formula

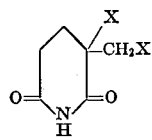

in which X has the indicated meaning, is reacted at a temperature between about 90° and 180° C. with a phosphoroxy halide of the formula $POX_3$, said glutarimide compound and said phosphoroxy halide being present in a molar ratio of from about 1:5 to 1:10.

5. A process in accordance with claim 4 for the preparation of

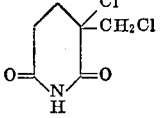

wherein said glutarimide of the formula

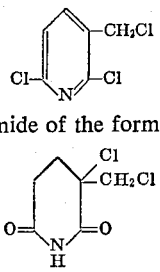

is reacted with phosphoroxy chloride under pressure and at a temperature between 155° and 165° C.

References Cited
UNITED STATES PATENTS
2,742,479  4/1956  Bavley et al. _____ 260—296

HARRY I. MOATZ, Examiner

U.S. Cl. X.R.

71—94; 260—281, 465.7, 465.8 R